Oct. 3, 1967                F. O. E. SCHULTZ                3,344,806
                               CHECK VALVE
                       Original Filed Nov. 25, 1964
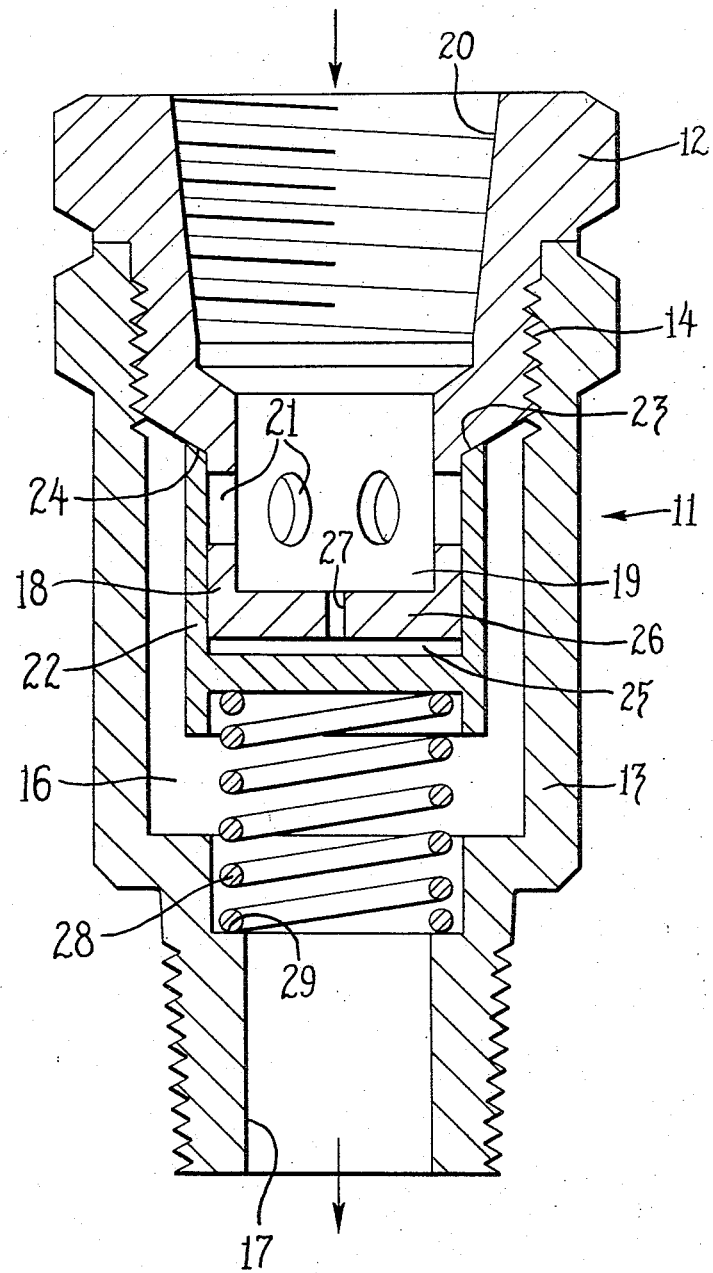
INVENTOR.
FORREST O.E. SCHULTZ
BY
Irvin L. Groh
ATTORNEY.

United States Patent Office 3,344,806
Patented Oct. 3, 1967

3,344,806
CHECK VALVE
Forrest O. E. Schultz, Owosso, Mich., assignor to Midland-Ross Corporation, Cleveland, Ohio, a corporation of Ohio
Continuation of application Ser. No. 413,863, Nov. 25, 1964. This application Sept. 27, 1966, Ser. No. 582,457
3 Claims. (Cl. 137—494)

ABSTRACT OF THE DISCLOSURE

The present invention relates to check valves particularly adapted for use in fluid lines wherein the fluid pressure is subjected to relatively high frequency pulsations, the check valve incorporating means for preventing hammering or chattering of the valve elements as a result of such high frequency pulsations.

---

This is a continuation of Ser. No. 413,863, filed Nov. 25, 1964, and now abandoned.

This invention relates to check valves to permit free fluid flow through a line in a given direction and prevent fluid flow through the line in the opposite direction. More particularly, the invention relates to a check valve for insertion in a fluid line where the fluid pressure in the line upstream of the check valve is subject to relatively high frequency pulsations.

A check valve according to the present invention is particularly well suited for service in the output line of a compressor in an automotive air brake system. Such systems usually employ a reciprocating compressor of the two-cylinder type to provide the motive fluid for the brake systems. It is a characteristic of reciprocating compressors that the outlet pressure will pulsate between a relatively low pressure, of the order of atmosphere to a relatively high pressure, of the order of perhaps twice the pressure of the system it is maintaining, the frequency of the pulsations may be of the order of 500 to 5000 pulsations per minute. It is customary to incorporate a receiver or reservoir downstream of the compressor to receive and store motive fluid from the compressor for delivery when required at a relatively constant pressure to the operating elements of a system. The pressure that will normally prevail in the receiver will be a pressure intermediate the extremes of pressure at the compressor outlet. This makes it necessary to provide a check valve to prevent backflow of fluid from the receiver through the line to the compressor at times when the compressor outlet pressure is in the lower portion of its pulsating range and when the compressor is idle, for example, when the vehicle is parked with the engine off.

The types of check valves heretofore known have been relatively short-lived when used in the line between the compressor and receiver of an air brake system. The reason for this is that relatively large variation in upstream pressure normally has caused the valve to completely unseat and reseat with each pulsation of pressure. This leads to a hammering effect which rapidly deteriorates valve elements. The problem is aggravated still more by the relatively high temperatures under which the valve must operate because of the heat generated during compression. The high temperatures preclude the use of materials such as rubber to absorb impact of the parts and as a practical matter, limit the valve elements to metal. This creates still other problems of sealing without eliminating deterioration due to hammering under high temperature conditions. Upon deterioration of the valves, fluid pressure may escape and, particularly in a braking system, can cause an extremely dangerous condition because little or no motive fluid will be available to stop the vehicle.

According to the present invention, however, there is provided a check valve which will operate with reasonably long life in the line between the compressor and the receiver of an automotive air brake system. Long life is attained in the check valve of the present invention by providing means which not only retards the usual oscillatory movement of the valve closure element as it opens and closes but also insures that such movement occurs in a range spaced from the valve seat.

It is a general object of the invention to provide a check valve which responds to pressure differential to open and close but which remains in an open position during rapid pressure fluctuations at the valve inlet thereby avoiding valve hammering and the resulting valve deterioration.

It is a further object to provide a check valve in which movement of the valve closure element is retarded in both directions toward and away from an open position over a wide range of pressures.

These and other objects will be readily apparent from the following description and from the drawing in which the single figure shows a cross-section view with the valve in a closed position.

As shown in the drawing, the valve 11 in accordance with the present invention comprises generally tubular inlet and outlet members 12 and 13 which are threaded together at 14 to form a unitary housing structure. Tubular member 13 forms an outlet chamber 16 which communicates with an outlet port 17. The outlet port is externally threaded for connection to a fluid delivery line (not shown). The tubular inlet member 12 is provided with a cup-shaped portion 18 which is disposed coaxially of and within outlet member 13 in spaced relation to the internal walls of the latter. The interior of the cup-shaped portion forms an inlet chamber 19 which is constantly open to an inlet port 20. A number of ports 21 are formed in the wall of the cup-shaped portion and are circumferentially spaced in a plane transverse to the axis of the valve housing. The flow of fluid through ports 21 is regulated by a valve member 22 which is generally cup-shaped and is supported for sliding movement on the cup-shaped member 18. The lip 23 of the cup-like valve member 22 is complementary to an annular seat 24 formed exterior of cup-shaped member 18. The surface of contact between the lip 23 and seat 24 is preferably frusto-conical.

The interior of the cup-like valve member 22 forms a damper chamber 25 which is almost completely closed by the bottom wall 26 of cup-shaped portion 18. Wall 26 is provided with a small orifice 27 to afford restricted interchange of fluid between inlet chamber 19 and damper chamber 25. Valve member 22 normally is urged toward a seated position by the biasing action of a relatively weak compression spring 28. One end of the spring is supported on an inner annular shoulder 29 of outlet member 13 and the other end is seated on the bottom end of valve member 22. This spring is incidental to the operation of the valve and is provided for the sole purpose of insuring that the movable valve element 22 will be in its closed position when the pressure in the system is zero and the compressor is started in operation. For all practical purposes the spring can be ignored in considering the basic function of the valve.

In operation, whenever the pressure in dampening chamber 25 exceeds the pressure in outlet chamber 16, the valve member 22 will move toward open position so that lip 23 leaves seat 24. Conversely, whenever the pressure in chamber 25 is less than the pressure in chamber 16, the valve member 22 will move toward closed position. The pressure in chamber 25 increases and decreases as the pressure in inlet chamber 19 increases and decreases. However, the port 27 restricts the free exchange of fluid between chambers 19 and 25 and as a result, when pressures in chamber 19 vary from 0 to a maximum, the pressure in chamber 25 will vary from a value only slightly above the pressure existing in passage 16 to a value only slightly below that pressure. In other words, the range of pressures in chamber 25 is narrower and falls within the range of pressures in inlet chamber 19. Since the effect of spring 28 is negligible, the sliding movement of valve 22 can be considered as depending solely upon the pressure differential between the dampening chamber 25 and outlet chamber 16. The rate of pressure change in the chamber 25 is dependent on the size of port 27 and, as a result, the amplitude of movement is controlled by selecting the size of port 27 as will be described more fully.

In addition to controlling the amplitude of movement of the valve member, the point to which the valve member moves in a return direction before it reverses to move in an opposing direction is determined by the axial spacing of the ports 21 from seat 24. Before any interchange of air can occur between inlet chamber 19 and outlet chamber 16, the valve member 22 must move away from its seat a sufficient distance to open ports 21. This permits oscillation of valve element 22 without contacting seat 24 until inlet pressure returns to a constant minimum. Thus, it is possible for valve 11 to operate in a fluid line subject to pressure pulsations without the need to unseat and reseat with each pulsation.

The operation of the valve is essentially dynamic but it may be helpful to consider the action of the components under a series of static situations. Assuming, for example, that the pressure in the system is 90 p.s.i. and that the compressor is not operating, atmospheric pressure will exist in chambers 19 and 25. The valve element 22 will therefore be held with lip 23 in engagement with seat 24 because of the 90 p.s.i. pressure in the system, that is, in chamber 16. Under these conditions, initiation of compressor operation causes a charge of air to be delivered to chamber 19 and to bleed through the restricted port 27 into the dampening chamber 25. The charge will have a pressure higher than the operating pressure of the system and a value of 150 p.s.i. can be assumed. Since the pressure in chamber 25 exceeds the 90 p.s.i. pressure in chamber 16, the valve element 22 is urged toward an open position a sufficient amount to uncover ports 21 permitting air flow to chamber 16. Assuming that the first charge of air from the compressor was neither high enough in pressure nor long enough in duration to cause opening of the ports 21, the charge of air will be trapped in the chambers 19 and 25 since it cannot escape through the compressor to the atmosphere. The second charge of air will raise the pressure and the third charge will raise it more until the pressure increases sufficiently to overcome the 90 p.s.i. in the system. When this occurs, the valve element will move to an open position. On the return, or the intake stroke, of the compressor piston, the pressure in chamber 19 will become less than the pressure in outlet chamber 16. This will tend to move the valve element 22 toward its seated and closed position. However, the valve element cannot return to a fully closed position unless the pressure in chamber 25 is reduced to at least 90 p.s.i. by escape of air through restricted port 27. Before sufficient air can escape, another compressor stroke of the piston takes place and creates a pressure impulse reversing the movement of the valve element in a closing direction.

For pulsating pressure applications of the magnitude and frequency of an automotive air brake system, it has been found that the spacing of ports 21 from the seat 24 ought to be such that dampening chamber 25 will become double in volume before the ports 21 begin to open and permit flow from inlet chamber 19 to outlet chamber 16. The port 27 is made of such a size that the period of time required for half of the fluid in chamber 25 to escape to the inlet chamber 19 is approximately equal to the time between pressure pulsations when the upstream pressure is pulsating at the lowest expected frequency. For a system operating at 500 pulsations per minute, this would be 0.12 second. At any higher frequency, the valve member will reciprocate in a range even more removed from the seat and therefore will be in even less danger of the valve lip and seat contacting each other.

The pulsations of pressure result in rapid reciprocation of the valve closure element but it will be observed that the present valve causes such movement to occur in a range removed from the valve seat. The valve seat is engaged by the valve closure element only when the delivery of air pressure is stopped. This makes for a valve in which hammering is eliminated so that the life and efficiency of the valve are greatly improved, even at high temperature.

The best mode to carry out this invention has been described to enable any person skilled in the art to make and use the same but it is to be understood that other modes of practicing the invention can be made by a skilled artisan without departing from the scope of the invention which is defined by the appended claims.

What is claimed is:

1. In a check valve, the combination including a housing member having a fluid inlet and a fluid outlet, a hollow guide portion fixedly positioned in said housing and having an end wall and a side wall, a valve seat in said housing, the interior of said guide portion being in fluid communication with said inlet, a port formed in said side wall of said guide portion in spaced relationship with respect to said valve seat and placing said inlet in communication with said outlet, a generally cup-shaped valve element slidably supported on said guide portion in sealing relationship with respect to the side wall thereof and controlling the flow of fluid through said port, said valve element having a portion thereon adapted to engage said valve seat in sealing relationship therewith, said valve element and said end wall of said guide portion cooperating to define a control chamber, an orifice in said end wall of said guide portion restricting the rate of flow of fluid between said control chamber and said fluid inlet, said valve element being reciprocable in response to differentials in fluid pressure between said outlet and said control chamber and being effective to control the flow of fluid through said port while remaining spaced from said seat.

2. In a check valve, the combination including a housing member having a fluid inlet and a fluid outlet, a generally cup-shaped guide portion fixedly positioned axially in said housing and having an end wall and a side wall terminating at a valve seat, the interior of said guide portion being in fluid communication with said inlet, a plurality of ports formed in said side wall of said guide portion in axially spaced relationship with respect to said valve seat and placing said inlet in communication with said outlet, a generally cup-shaped valve element mounted for reciprocation on said guide portion in sealing relationship with respect to the side wall thereof and controlling the flow of fluid through said ports, said valve element having an end portion adapted to engage said valve seat in sealing relationship therewith, said valve element and said end wall of said guide portion forming a variable volume control chamber, an orifice in said end wall of said guide portion restricting the rate of flow of fluid between said control chamber and said fluid inlet to retard movement of said valve element with respect to said guide portion in response to differentials in fluid pressure between said outlet and said inlet, said valve element being reciprocable on said guide portion in response to differentials in fluid pressure between said outlet and said control chamber and being effective to control the flow of fluid through said ports while said end portion of said valve element remains substantially spaced from said seat.

3. The combination as set forth in claim 2, means biasing said valve element toward said seat, and means limiting the movement of valve element away from said seat.

References Cited

UNITED STATES PATENTS 1,942,433   1/1934   Lindsay _____ 137—514 X
2,087,037   7/1937   McCarthy _____ 137—501 X M. CARY NELSON, *Primary Examiner.*

R. J. MILLER, *Assistant Examiner.*